Dec. 19, 1961 K. OSTERTAG 3,013,949
TURNING AND CONVEYING APPARATUS FOR THE GERMINATING
MASS IN A TRAVELING-HEAP MALTING PLANT
Filed April 6, 1960
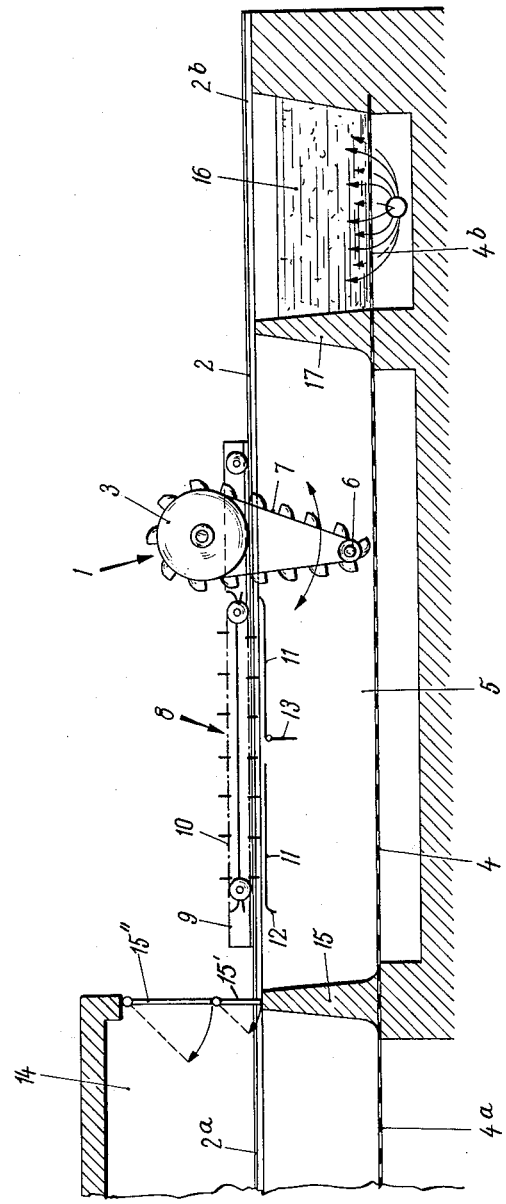
INVENTOR:
KONRAD OSTERTAG
by
Mestern & Kollin
ATTORNEYS 3,013,949
TURNING AND CONVEYING APPARATUS FOR THE GERMINATING MASS IN A TRAVELING-HEAP MALTING PLANT
Konrad Ostertag, Perhamerstr. 14, Munich, Germany
Filed Apr. 6, 1960, Ser. No. 20,466
Claims priority, application Germany Apr. 7, 1959
12 Claims. (Cl. 195—129)

The invention relates to a turning and conveying apparatus for the germinating mass of a traveling-heap malting plant, advantageously combined with a kiln and a steeping chamber, which includes a carriage movable on rails attached on either side above the germinating bed.

In pneumatic malting, carriage-type plants are in use in which the individual sections of the germinating plant, being arranged one behind the other, form one large and long stretched common germinating bed, such bed being subdivided only underneath its perforated floor plates, which carry the heaps, into suitable sections, so-called day sections, which are differently and controllably aerated from below. In order to avoid all manual labor—except for the cleaning activities required from time to time—a carriage traveling along the germinating bed, and more especially on its side walls, is used in these known malting systems to support a bucket conveyor or similar device guided along a triangular path and extending over the full width of the bed and down to the perforated floor. The conveyor picks up the germinating mass, first the steeped, then the germinating barley and finally the green malt, carries it back in a direction opposite to the direction of carriage travel over a prescribed distance, and discharges it again, thus causing the barley to be turned and gradually moved onward to advance the heap. As compared to older devices working with inclined hoists or combinations of inclined hoists and paddle wheels, this apparatus constitutes a considerable simplification. Within certain limits it is, for example, adaptable to the natural slope of the heap. Recent developments of traveling-heap malting have shown, however, that such apparatus and more especially the turning conveyor itself is incapable of fully satisfying all technological requirements.

The invention therefore relates to an improved type of turning and conveying apparatus for the germinating mass of traveling-heap malting plants and aims at providing them with a pick-up mechanism which, as compared to known carriages with a triangularly guided bucket conveyor, can be far better adapted to the changing natural slope of the heaps that becomes steeper with the growing of germs, so that is can pick up the mass much more carefully and avoid any damaging or breaking of the germs; additionally, it provides a means for selectively discharging the germinating mass released by the pick-up buckets after a traverse of a complete day section or a fraction thereof, thus making the device more universally applicable and better adaptable to various conditions by enabling it to turn the barley at one's option once or twice a day.

According to the invention this is realized by a construction of the carriage including, for the purpose of both picking up and putting down the germinating mass according to the individual natural slope of the heap, a pick-up mechanism carried on a supporting base on which it is adjustable, tiltable, and preferably capable of being lifted out, attached to a horizontal conveying device traveling together with it on the rails, the latter conveying device being adapted to carry out the horizontal displacement and the discharge of the mass picked up and released to it by the pick-up mechanism.

The pick-up mechanism of a preferred embodiment consists of a rotary bucket conveyor or chain scraper guided on one or several big parallel pulleys, arranged side by side and normal to the rails above the horizontal conveyor and on one or several small pulleys arranged directly above the floor plates. The sole task of this pick-up mechanism is to remove the germinating mass carefully and cautiously and to feed it to the horizontal conveying device to which it is attached. In order to adapt it to the natural slope of the mass varying with the growth of germs, the mechanism is preferably carried so as to be rotatable around the axis of the top pulley. In small and simple plants the pulley-supported bucket conveyor can be replaced by a drum or similar device fitted at the outside with buckets or scrapers.

The horizontal conveying device is movable jointly with the pick-up mechanism and consists of a scraper conveyor extending over the entire width of the carriage, or of a suitable combination of conveyor belts, or of an inclined vibrating slide plate, e.g. with parallel guiding strips running alongside. This conveying device receives the germinating mass as it is released by the pick-up mechanism and conveys it to the rear. The horizontal conveying device is of the length of a day section, i.e. the mass is carried back over a distance corresponding to such section. In order to enable conveying over a shorter distance, preferably a distance corresponding to a half-day section, flaps opening downward are arranged in the slide plate, about half-way along its length, through which the germinating mass can be discharged e.g. at the midpoint of the conveyor length if required. If conveyor belts are used, scrapers and distributors should be fitted at suitable spots or two conveyor belts or two groups of converyor belts should be arranged behind each other so that the last one can be disconnected. The germinating mass is then discharged from the foremost belt or belts.

In addition to the advantages described and due to both the fact that it can be lifted out and the altered shape of its pick-up scraper or bucket mechanism, the turning and conveying mechanism according to the invention offers also the advantage of eliminating the need for partition walls in the germinating bed. This greatly simplifies the combination of the traveling-heap plant with a kiln and a steeping chamber arranged at its rear and front ends, respectively. The design of the turning machine according to the invention is thus of decisive influence on the over-all organization of the malting plant.

The kiln is directly connected with the germinating bed of the plant; the supporting rails of the turner extend into the kiln. A heat-resisting partition wall is arranged between the kiln and the germinating plant, the upper part of this wall forming a rolling or swinging door, e.g. in such a way that the lower part of same corresponds to the height of the horizontal conveying device and the upper part to the height of the rotary conveyor, each of these door sections being automatically opened by the respective conveyor on its entry into the kiln. The use of building material of great heat resistance in the partition wall and the proper construction thereof eliminates the need for an air lock. As a further improvement of the plant, an aeration system is utilized which is controlled in such a way as to shut off kiln aeration when the rolling of swinging door is opened. At the same time the kiln exhaust-air ducts are fully opened, those of the germinating plant are shut. This results in an air flow from the germinating plant to the kiln, thereby preventing heat in the kiln from escaping into the germinating plant.

The turning and conveying apparatus according to the invention, adapted to operate across partition walls, also enables a very satisfactory combination of the germinating plant with a steeping chamber.

According to this feature of the invention, a steeping tank holding the quantity of barley required for a day section is placed immediately adjacent the front end of, but separated by a partition wall from, the traveling-heap plant which is equipped with a turning and conveying apparatus as described above. The rails for the turning and conveying apparatus run also on either side wall of the steeping tank. The tank is fitted with an inserted perforated floor plate to admit air during barley washing and steeping. Thus the steeping tank can be aerated from below while being filled with barley and water. When air is blown in from below through the perforated tank floor, it penetrates the barley stored at a uniform height under water and sets the grains in motion so that they rub against each other. The barley is thereby thoroughly cleaned, at the same time taking up water and oxygen. As compared to the hitherto customary system of aerated funnel steeps, this system is advantageous in that the height of the layer is constant throughout the tank, the barley thus being treated uniformly.

Further particulars of the invention are to be seen from the embodiment of a traveling-heap malting plant according to the invention shown in the accompanying drawing which will now be described:

The sole figure of the drawing shows a schematic longitudinal section of a germinating plant with a kiln and a steeping tank. Pick-up mechanism 1 consists of a bucket conveyor 7 running over big pulleys 3 situated above the guide rails 2 for the supporting base of the turning and conveying apparatus, and immediately above the perforated floor 4 of germinating bed 5 over small pulleys 6. It removes the germinating mass from the heap and feeds it to the horizontal conveyor 8 to which it is attached. In order to adapt pick-up 1 to the natural angle of slope which changes with the growth of the germs, the pick-up conveyor 7 can be rotated around the axis of big pulleys 3, as indicated by the arrow, even to the extent of being lifted out of bed 5. Pick-up mechanism 1 and conveying device 8 are preferably jointly movable on rails 2 by means of their supporting base 9. Conveying device 8 consists of a scraper conveyor 10 extending over the width of the turning machine. It takes over the barley from pick-up mechanism 1 and conveys it back along slide plate 11 over the length of a day section to the end 12 of slide plate 11. In order to facilitate a back-conveying over half the length of a day section, a flap 13, shown opened in the drawing, is provided midway along the length of slide plate 11.

Kiln 14 directly adjoins the germinating bed 5, its rails 2a and floor plates 4a forming a continuation of the corresponding parts 2 and 4 of the germinating bed. Between kiln 14 and germinating bed 5 there is disposed a heat-resistant partition wall 15, 15', 15'', the intermediate part 15' being at least as high as or higher than the conveying device 8 and designed as a rolling or, as shown, an upwardly swinging door. This door is opened by the conveying device itself on its entry into the kiln. In this way the green malt can be taken into kiln 14 directly from the malting bed by means of pick-up mechanism 1, which remains in malting bed 5, and the conveying device 8, which juts into kiln 14. If the pick-up mechanism is to be operated in kiln 14, it is lifted out of malting bed 5 in front of the lower partition wall 15 and is reinserted therein within kiln 14 after having been swung about its axis and passed through the double swinging door 15', 15''.

A water-filled steeping tank 16 is arranged at the front end of malting bed 5 from which it is separated by a partition wall 17. The perforated floor 4b of steeping tank 16 in the steeping chamber is situated at the same level as floor 4 of germinating bed 5. Rails 2b are also extensions of the rails running on either side of germinating bed 5. After being lifted out of germinating bed 5 and lowered into steeping tank 16, pick-up mechanism 1 can convey the cleaned and steeped barley from out of the steeping tank directly upon the germinating bed with the aid of conveying device 8.

I wish it to be understood that I do not desire to be limited to the exact details of construction shown and described, as obvious modifications will occur to a person skilled in the art.

Having thus described the invention, I claim:

1. A turning and conveying apparatus for the germinating mass of a traveling-heap malting plant, comprising a bed for said mass, guide means extending horizontally above said bed, an elongated carriage displaceable along said guide means, first conveyor means extending substantially horizontally along said carriage, second conveyor means positioned generally vertically at a fixed location near one end of said first conveyor means for picking up said mass from said bed and depositing it on said first conveyor means for delivery thereby to the opposite end of the latter, and discharge means for said mass at a location of said first conveyor means intermediate said second conveyor means and said opposite end, said discharge means being selectively operable to release said mass from said first conveyor means ahead of said opposite end.

2. An apparatus according to claim 1 wherein said first conveyor means comprises at least one endless belt and supporting means for said mass spacedly extending underneath said belt, said supporting means being provided with a gap at said intermediate location, said discharge means including openable closure means for said gap.

3. An apparatus according to claim 2 wherein said belt is provided with a series of scraper blades spaced along its length and extending close to the upper surface of said supporting means.

4. An apparatus according to claim 1 wherein said first conveyor means comprises an endless belt provided with buckets spaced along its length.

5. An apparatus according to claim 1 wherein said first conveyor means comprises at least one inclined vibratory plate.

6. A turning and conveying apparatus for the germinating mass of a travelling-heap malting plant, comprising a bed for said mass, guide means extending horizontally above said bed, an elongated carriage displaceable along said guide means, first conveyor means extending substantially horizontally along said carriage, second conveyor means positioned generally vertically at a fixed location near one end of said first conveyor means for picking up said mass from said bed and depositing it on said first conveyor means for delivery thereby to the opposite end of the latter, said second conveyor means having an axis above said first conveyor means and being swingable about said axis, and discharge means for said mass at a location of said first conveyor means intermediate said second conveyor means and said opposite end, said discharge means being selectively operable to release said mass from said first conveyor means ahead of said opposite end.

7. A turning and conveying apparatus for the germinating mass of a traveling-heap malting plant, comprising a bed for said mass, guide means extending horizontally above said bed, an elongated carriage displaceable along said guide means, first conveyor means extending substantially horizontally along said carriage, and second conveyor means positioned generally vertically at a fixed location near one end of said first conveyor means for picking up said mass from said bed and depositing it on said first conveyor means for delivery thereby to the opposite end of the latter, said second conveyor means including a relatively large upper pulley having an axis above said first conveyor means, a relatively small lower pulley swinging about said axis and an endless belt embracing both said pulleys.

8. A turning and conveying apparatus for the germinating mass of a traveling-heap malting plant, comprising a bed for said mass, guide means extending horizontally above said bed, an elongated carriage displaceable along said guide means, first conveyor means extending substantially horizontally along said carriage, second conveyor means positioned generally vertically at a fixed location near one end of said first conveyor means for picking up said mass from said bed and depositing it on said first conveyor means for delivery thereby to the opposite end of the latter, said second conveyor means including a relatively large upper pulley having an axis above said first conveyor means, a relatively small lower pulley, and being swingable about said axis, and an endless belt embracing both said pulleys, and discharge means for said mass at a location of said first conveyor means intermediate said second conveyor means and said opposite end, said discharge means being selectively operable to release said mass from said conveyor means ahead of said opposite end.

9. In a turning and conveying apparatus for the germinating mass of a traveling-heap malting plant, in combination, a bed for said mass, a kiln at one end of said bed, partition means at said kiln separating the lower portion thereof from said bed, a door at said kiln above said partition means, guide means extending horizontally above said bed and continuing into said kiln past said door, an elongated carriage displaceable along said guide means, first conveyor means extending substantially horizontally along said carriage, said door having a first portion openable to admit part of said carriage along with part of said first conveyor means into said kiln, and second conveyor means positioned generally vertically at an extremity of said first conveyor means remote from said kiln for picking up said mass from said bed and depositing it on said first conveyor means for delivery thereby to the opposite extremity of the latter, said second conveyor means being retractable from said bed for clearing said partition means, said door having a second portion openable to admit said second conveyor means.

10. The combination according to claim 9 wherein said first and second door portions are upwardly swingable about respective axes.

11. In a turning and conveying apparatus for the germinating mass of a traveling-heap malting plant, in combination, a bed for said mass, a kiln at one end of said bed, a steeping tank at the other end of said bed, partition means at said kiln and at said tank separating the lower portions thereof from said bed, a door at said kiln above said partition means thereof, guide means extending horizontally above said bed and said tank and continuing into said kiln past said door, an elongated carriage displaceable along said guide means, first conveyor means extending substantially horizontally along said carriage, said door having a first portion openable to admit part of said carriage along with part of said first conveyor means into said kiln, and second conveyor means positioned generally vertically at an extremity of said first conveyor means remote from said kiln for picking up said mass from said bed and depositing it on said first conveyor means for delivery thereby to the opposite extremity of the latter, said second conveyor means being retractable from said bed by swinging movement about a horizontal axis above said first conveyor means for clearing said partition means, said door having a second portion openable to admit said second conveyor means into said kiln in its retracted position.

12. The combination according to claim 11, further comprising aeration means coupled with said door for creating an air flow from said bed to said kiln in the open state of said door.

References Cited in the file of this patent

UNITED STATES PATENTS 1,230,236     Stuart _____ June 19, 1917

FOREIGN PATENTS 812,302     Great Britain _____ Apr. 27, 1959